Oct. 1, 1968 F. DEUSCHLE ETAL Re. 26,470
ASPIRATING DEVICE
Original Filed June 26, 1963
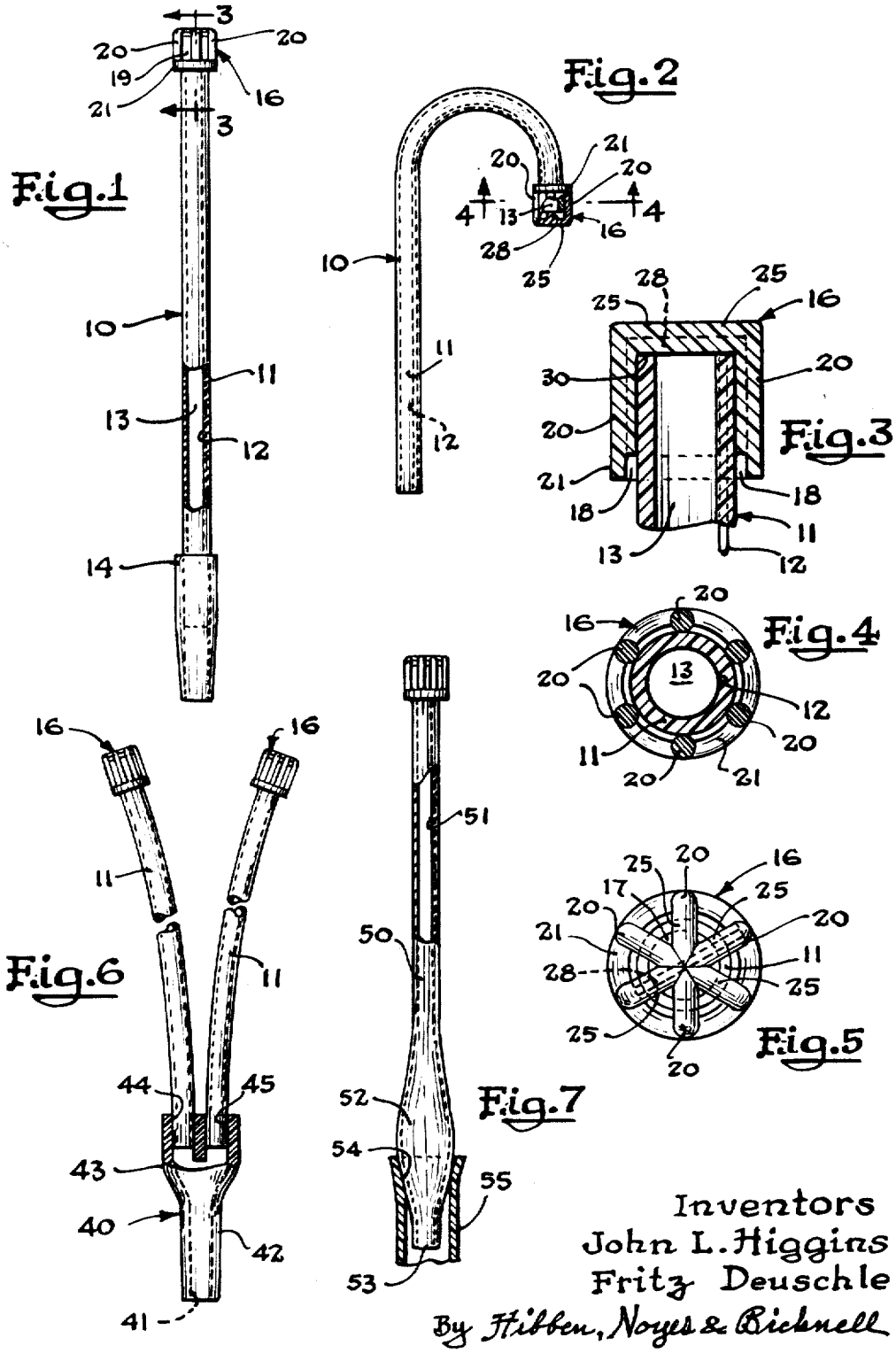
Inventors
John L. Higgins
Fritz Deuschle
By Hibben, Noyes & Bicknell
Attorneys United States Patent Office Re. 26,470
Reissued Oct. 1, 1968

26,470
ASPIRATING DEVICE

Fritz Deuschle, St. Augustine, and John L. Higgins, Daytona Beach, Fla., assignors to Roehr Products Company, Inc., DeLand, Fla., a corporation of Delaware Original No. 3,256,885, dated June 21, 1966, Ser. No. 290,785, June 26, 1963. Application for reissue Feb. 13, 1967, Ser. No. 629,342
6 Claims. (Cl. 32—33)

Matter enclosed in heavy brackets [ ] appears in the original patent but forms no part of this reissue specification; matter printed in italics indicates the additions made by reissue.

*ABSTRACT OF THE DISCLOSURE*

*A fluid aspirating device which has a tip placed into a cavity into which fluid such as saliva drains so as to continuously remove said fluid during the execution of some procedure such as dental work. The aspirating device is in the form of a nozzle tip which telescopes over the end of a drainage tube and has ribs running parallel to the longitudinal axis of the tube along the outside surface of said tube to permit flow of fluid between said ribs. The ribs are joined at their proximal end by a ring portion spaced from the outer surface of the tube to permit fluid to flow between the ring and the tube into the spaces between the ribs. The ribs are turned inward in spaced relation from the end of the tube and join adjacent ribs in the vicinity of the longitudinal axis of the tip. The inwardly directed ribs are spaced from the end of the tube so that fluid can flow into the end of the tube without obstruction either from foreign material in the cavity or from material defining the cavity being drained.*

The present invention relates generally to aspirating apparatus, and more particularly to an improved saliva ejecting device which can be produced at a sufficiently low cost to be disposable after a single use.

Many types of fluid ejecting devices have been produced for use in dentistry and in other healing arts, but devices of this type which are presently available and which can be produced at a low cost fail to have many of the essential requisites of a satisfactory fluid ejector. For example, saliva ejectors having a curved tubular mouth piece made of paper and similar materials cannot be readily shaped by the dentist to any desired curvature to fit the patient's mouth nor do they prevent occlusion of the end thereof by the tissue of the patient's mouth. And, the presently available saliva ejectors which are capable of being readily formed to the patient's mouth and which do not become readily occluded during use are too costly to be disposable after a single use, are generally formed of hard relatively heavy material which have sharp edges and are often uncomfortable to the patient's mouth.

It is therefore an object of the present invention to provide an improved aspirator structure which can be produced and packaged at a low cost so as to be disposable after a single use.

It is also an object of the present invention to provide a fluid ejector which can be economically manufactured and packaged and which is more conveniently used and handled than other fluid ejecting devices.

It is a further object of the present invention to provide an improved low cost, disposable saliva ejecting device which is formed essentially of light weight soft plastic material comfortable to the patient's mouth, which is capable of being readily shaped to conform with the patient's mouth and which is provided with an inexpensive nozzle tip designed to avoid occlusion by tissue in the patient's mouth.

It is still another object of the present invention to provide an improved nozzle tip for an aspirating device.

Other objects of the present invention will be apparent to those skilled in the art from the following detailed description and claims when read in conjunction with the accompanying drawing; wherein:

FIG. 1 is a front elevational view showing one embodiment of a saliva ejector device of the present invention;

FIG. 2 is a fragmentary side elevational view partially in vertical section of the saliva ejector of FIG. 1 in an operative position of adjustment;

FIG. 3 is an enlarged vertical sectional view taken along the line 3—3 of FIG. 1;

FIG. 4 is an enlarged horizontal sectional view taken along the line 4—4 of FIG. 2;

FIG. 5 is an end elevational view of the nozzle tip shown in FIGS. 1–4;

FIG. 6 is a further modified form of saliva ejector device according to the present invention; and FIG. 7 is a fragmentary side elevational view of a modified form of saliva ejector device according to the present invention.

Referring to FIGS. 1–5 of the drawing, a saliva ejector device 10 is shown comprising a length of preferably clear, smooth, soft, light, flexible plastic tubing 11, such as extruded plasticized polyvinyl chloride or polyethylene plastic tubing, having embedded in a wall section thereof a malleable element, such as the malleable wire 12, extending the length of the said tubing 11. The wire 12 serves to retain the tubing 11 in any desired form into which the wire is bent and tends to prevent collapse of the tube under vacuum pressures. The malleable wire 12 can be a soft iron wire, an aluminum wire or any similar malleable material. If desired, a thin strip of malleable metal can be embedded within the wall of the plastic tubing 11 in place of a wire. Nor is it necessarily required that the malleable element be embedded in the tubing so long as suitable means are provided for maintaining the malleable element within the tubing 11. In use the length of tubing 11 with a malleable element of the above type associated therewith can be bent, preferably with the malleable element forming the inside circumference of the bend, so that the end section of the tubing 11 overhangs the patient's jaw with the end of the tubing positioned in the lowermost portion of the patient's mouth.

On the lower or proximal end of the tubing 11 as shown in FIG. 1 there is secured an adapter means, such as the tapered plastic member 14, for connecting one end of the tubing 11 to a tube 15 in communication with a source of vacuum, such as vacuum pump (not shown).

On the upper or distal end of the tubing 11 is secured a nozzle tip 16 which partially closes the end of the tubing 11 and provide a plurality of small diameter axial passageways 17, 18 and a plurality of lateral passageways 19 through which saliva or other fluids can pass inwardly into the axial passage 13 of the tubing 11 while screening out larger particles which might obstruct or clog the passage 13.

The nozzle tip 16 is preferably molded of a smooth, soft, flexible plastic material, such as plasticized polyvinyl chloride or polyethylene plastic, and comprises a plurality of axially extending rib sections 20 of a small diameter which are spaced circumferentially preferably equidistant from each other and radially from the longitudinal axis of the tip 16 a maximum distance equal to the exterior radius of the tubing 11 and preferably a distance slightly less than the exterior radius of the tubing 11. Thus, the axial rib sections 20 are so spaced that a circle drawn through the innermost surface of each of the spaced axial rib sections 20 has as a maximum a diameter equal to the diameter of the tubing 11 and preferably has a diameter slightly smaller than the exterior diameter of the tubing 11 so that the inner surface of the rib sections 20 contact the exterior surface of the tubing 11 when the tip 16 is telescopically mounted over the end of the tubing 11.

The cylindrical rib sections 20 have their proximal ends formed integrally with a short cylindrical section 21 which has an inner diameter slightly greater than the exterior diameter of the tubing 11 on which the tip 16 is mounted, and the distal ends of the cylindrical sections 20 are connected to preferably radial transversely extending end member 25 which preferably have a small diameter semi-cylindrical form. Each of the end members 25 is integrally joined at its inner end with every other end member 25 at a point adjacent the longitudinal axis of the tip 16. It is preferred that each end member 25 be disposed diametrically opposite another end member 25 so that two oppositely disposed end members 25 extend diametrically across the end of the tip 16. The inner or proximal surface of the end members 25 is preferably flat.

At least one pair of said oppositely disposed end members 25 preferably have a rectangular spacing member 28 with a substantially smaller diameter or width than the inner diameter of the tubing 11 formed integrally with and projecting axially rearwardly from the inner surface of the end member 25 a distance less than the length of the rib section 20. The spacing member 28 preferably extends diametrically across the tip 16 with the opposite ends of the spacing member 28 preferably formed integrally with the oppositely disposed axial rib sections 20 contiguous therewith.

When the nozzle tip 16 is mounted telescopically over the end of the tubing 11, the inner surfaces of the axial cylindrical section 20 engage the outer surface of the tubing 11 and space the inner lateral surface of the cylindrical section 21 from the outer lateral surface of the tubing 11 at a point spaced axially from the end 30 of the tubing 11. The telescopic axial movement of the tip 16 over the end of the tubing 11 is arrested by the proximal inner edge of the spacing member 28 contacting the lower transverse end wall 30 of the tubing 11. The nozzle tip 16 is fixedly secured on the tubing 11 in spaced relationship with the end 30 preferably by forming a solvent seal between the portions of the rib sections 20 which engage the outer surface of the tubing 11. The proximal surfaces of the end members 25 are thus maintained in spaced relationship with the end wall 30 of the tubing 11 to provide both axial and lateral fluid passages through said nozzle tip 16 for saliva to enter the axial passage of the tubing 11. The foregoing nozzle tip construction provides an inexpensive, efficient, clog-proof tip which will not suck tissue in the patient's mouth and become readily occluded.

In the modified form of the invention shown in FIG. 6 of the drawing, an adapter fitment 40 is provided with an axial tubular section 41 having a tapered proximal outer surface 42 which is adapted to sealably engage a tube connected with a vacuum source and is also provided with a dual adapter section 43 having a pair of spaced openings 44, 45. Each of the openings 44, 45 is adapted for sealably receiving therein the end of a length of the tubing 11 having a nozzle tip 16 mounted on the distal end thereof. The adapter fitment 40 is preferably made of soft, yieldable plastic, such as polyvinyl chloride plastic, which firmly, frictionally and sealably engages the outer surface of the end of the tubing 11 when inserted therein. And, whereas the ends of the tubing 11 are not movable relative to the fitment 40 after insertion therein, the lengths of tubing 11 can be readily bent to any desired configuration so that saliva can be removed from the opposite sides of the patient's mouth, if such is desired.

The further modified form of the present invention shown in FIG. 7 shows an improved integral adapter means for connecting a fluid ejector structure to a tube communicating with a source of vacuum. Thus, the end of a length of tubing 50 having a malleable wire 51 imbedded in the wall thereof is deformed to provide an enlarged diameter section 52 spaced a short distance forwardly of the proximal end 53. It will be evident that when the proximal end 53 is inserted in the end of the tube 55 leading to a source of vacuum, the tapered walls 54 of the enlarged diameter section 52 will form a direct resilient sealable connection with the interior of tube 55 and there is no necessity of providing a separate adapter piece on the end of the tubing 50.

Others may practice the invention in any of the numerous ways which are suggested to one skilled in the art by this disclosure, and all such practice of invention are considered to be a part hereof which fall within the scope of the appended claims.

We claim:

1. In a fluid aspirating device having a length of small diameter tubing bendable into a configuration which overhangs the jaw of a patient with one end of said tubing adapted to be detachably connected with a source of vacuum, a nozzle tip telescopically mounted over the open [outer] *other* end *portion* of said tubing, said nozzle tip comprising a plurality of circumferentially spaced [axial] *axially* extending rib sections which are radially spaced from the longitudinal axis of said tip a maximum distance equal to the exterior radius of said tubing whereby said ribs contact the surface of said tubing when said tip is telescopically mounted over said other end of the tubing, said rib sections having the proximal [ends] *end portions* thereof integrally formed with a generally cylindrical section which has a diameter larger than the exterior diameter of the said tubing and the distal end of each of said rib sections being connected to form an end section extending transversely of the said outer end of said tubing by having each said rib section integrally joined with every other rib section [at a point] adjacent the longitudinal axis of said tip, and said nozzle tip being fixedly mounted on said outer end of said tubing with an inner surface portion of each said rib sections in engagement with said lateral surface of said tubing and said end sections being spaced from said [outer] *other* end of said tubing; whereby a plurality of longitudinal and transverse fluid passages are provided leading into the said [outer] *other* open end of said tubing when said nozzle tip is telescopically mounted over the said [outer] *other* end of said tubing.

2. In a fluid aspirating device having a length of small diameter tubing bendable into a configuration which overhangs the jaw of a patient with one end of said tubing adapted to be detachably connected with a source of vacuum, a nozzle tip telescopically mounted over the open [outer] *other* end *portion* of said tubing, said nozzle tip comprising a plurality of circumferentially spaced [axial] *axially* extending rib [section] *sections* which are radially spaced from the longitudinal axis of said tip a maximum distance equal to the exterior radius of said tubing whereby said ribs contact the *lateral* surface of said tubing when said tip is telescopically mounted over said other end of the tubing, said rib sections having the proximal [ends] *end portions* thereof integrally formed with a generally cylindrical section which has a diameter larger than the exterior diameter of the said tubing and the distal end *portions* of each of said rib sections being connected to form an end section extending transversely of the said [outer] *other* end of said tubing by having each said rib section integrally joined with every other said rib section [at a point] adjacent the longitudinal axis of said tip, at least one of said distal end [members] *portions* having extending axially rearwardly from the proximal surface thereof a spacing member of a width less than the diameter of the axial passage in said tubing and a length less than said rib sections, and said nozzle tip being fixedly mounted on said [outer] *other* end *portion* of said tubing with said spacing member engaging a transverse end surface of said tubing and having an inner surface portion of each said rib section in secure engagement with said lateral surface of said tubing; whereby a plurality of longitudinal and transverse fluid passages are provided leading into said open [outer] *other* end of said tubing when said tip is telescopically mounted over the said [outer] *other* end of said tubing.

3. In a fluid aspirating device having a length of small diameter tubing bendable into a configuration which overhangs the jaw of a patient with one end of said tubing adapted to be detachably connected with a source of vacuum, a nozzle tip telescopically mounted over the open [outer] *other* end *portion* of said tubing, said nozzle tip comprising a plurality of circumferentially spaced [axial] *axially* extending rib sections with each rib section disposed diametrically opposite another rib section, said rib sections being radially spaced from the longitudinal axis of said tip a maximum distance equal to the exterior radius of said tubing whereby said ribs contact the surface of said tubing when said tip is telescopically mounted over said other end *portion* of the tubing, said rib sections having the proximal [ends] *end portions* therefor integrally formed with a generally cylindrical section which has a diameter larger than the exterior diameter of the said tubing and the distal end of each of said rib sections being connected to form an end section extending transversely of the said outer end *portion* of said tubing by having each said rib section integrally joined at the inner end thereof adjacent the longitudinal axis of said tip with every other said rib section, at least one pair of oppositely disposed rib sections having extending axially rearwardly from the proximal surface thereof a spacing member of a width less than the diameter of the axial passage in said tubing and a length less than said rib sections, and said nozzle tip being fixedly mounted on said other end *portion* of said tubing with said spacing member engaging a transverse end surface of said tubing and having a portion of the said rib sections in secure engagement with said lateral surface of said tubing; whereby a plurality of longitudinal and transverse fluid passages leading into said [outer] *other* open end of said tubing are provided when said tip is telescopically mounted over the said [outer] *other* end of said tubing.

*4. In a fluid aspirating device having a length of small diameter tubing bendable into a configuration which overhangs the jaw of a patient with one end of said tubing adapted to be detachably connected with a source of vacuum, a nozzle tip telescopically mounted over the other end portion of said tubing, said nozzle tip comprising an attaching portion and an end portion, said attaching portion having a plurality of circumferentially spaced axially extending rib sections, the radially inwardly disposed surface of each rib section being radially spaced from the longitudinal axis of said tip a maximum distance equal to the exterior radius of said tubing whereby said radially inwardly disposed surfaces contact the lateral surface of said tubing when said attaching portion of said tip is telescopically mounted over said other end portion of the tubing, said attaching portion having a generally cylindrical section with a diameter larger than the exterior diameter of the said tubing and with at least the proximal end portions of said rib sections integrally formed therewith, said end portion of said tip having a plurality of circumferentially spaced axially extending rib sections operatively connected with the rib sections of said attaching portion and extending outwardly beyond the end of said tubing, each rib section of said end portion having a portion directed inwardly toward the longitudinal axis of said tip and being joined in the vicinity of said longitudinal axis with comparable portions of adjoining rib sections, said nozzle tip being fixedly mounted on said outer end portion of said tubing with an inner surface portion of each rib section of said attaching portion in engagement with said lateral surface of said tubing and the inwardly directed portions of the rib sections of said end portion being spaced from said outer end of said tubing; whereby a plurality of longitudinal and transverse fluid passages are provided leading into the said other open end of said tubing when said nozzle tip is telescopically mounted over the said other end portion of said tubing.*

*5. In the fluid aspirating device as claimed in claim 4 wherein means are provided on at least one of said rib sections to abut against the end surface of said tubing for spacing said inwardly directed portions of the end portions from said end surface of said tubing.*

*6. In the fluid aspirating device as claimed in claim 5 wherein said means comprises a spacing member on at least one of said inwardly directed portions of said rib sections of said end portion extending axially rearwardly from the proximal surface of said inwardly directed portion of said rib section into engagement with the end surface of said tubing, said spacing member being of a width less than the diameter of the axial passage of said tubing and being of a length less than the length of said rib sections of said end portion.*

References Cited

The following references, cited by the Examiner, are of record in the patented file of this patent or the original patent.

UNITED STATES PATENTS

| | | | |
|---|---|---|---|
| 780,710 | 1/1905 | Dickinson | 128—242 |
| 2,529,499 | 11/1950 | Jankelson | 32—33 |
| 2,637,106 | 5/1953 | Otis | 32—33 |
| 2,667,166 | 1/1954 | Scheer | 128—242 |
| 2,670,539 | 3/1954 | Wall | 32—33 |
| 2,859,518 | 11/1958 | Cohn | 32—33 |
| 2,873,528 | 2/1959 | Thompson | 32—33 |

FOREIGN PATENTS

| | | |
|---|---|---|
| 15,344/12 | 1912 | Great Britain. |
| 283,236 | 5/1952 | Switzerland. |

CHARLES F. ROSENBAUM, *Primary Examiner.*